United States Patent

[11] 3,593,131

[72] Inventors Henry Mittel, Jr.
Arlington;
Charles J. Stalmach, Jr., Grand Prairie,
both of, Tex.
[21] Appl. No. 829,628
[22] Filed June 2, 1969
[45] Patented July 13, 1971
[73] Assignee LTV Aerospace Corporation
Dallas, Tex.

[54] MEANS AND METHOD FOR MEASURING THE
PHASE OF AN ALTERNATING ELECTRICAL
SIGNAL
17 Claims, 4 Drawing Figs.

[52] U.S. Cl. ................................................. 324/83 A
[51] Int. Cl. ................................................... G01r 25/00
[50] Field of Search ...................................... 324/83 A;
328/133, 109, 134; 307/232

[56] References Cited
OTHER REFERENCES
O' Brien, E. M. "Integrating Phase Meter." RCA TECHNICAL NOTE No. 799, Oct. 17, 1968.

*Primary Examiner*—Alfred E. Smith
*Attorneys*—H. C. Goldwire and Charles W. McHugh ABSTRACT: A method and circuitry for measuring the phase difference between two alternating electrical signals wherein one of the signals maintains parameters which are known and the second of the signals bears an unknown, varying phase relationship with respect to the first signal. The integrate modes of a pair of three-mode integrators are simultaneously initiated by a signal responsive to an initial zero-crossing point of a half-cycle of a reference signal, and the hold mode of one of the integrators is initiated by a signal responsive to the next half-cycle zero-crossing point of the reference signal; the hold mode of the second integrator is initiated by a signal responsive to the initial zero-crossing point of a half-cycle of a variable-phase signal. The output signals from the integrators are coupled to an analog divider which output is selectively sampled by sample-and-hold circuitry, and the output signal from the sample-and-hold circuitry is displayed on coupled indicating means. The command signal to the sample-and-hold circuitry is triggered by means responsive to the zero-crossing point of the half-cycle reference signal.

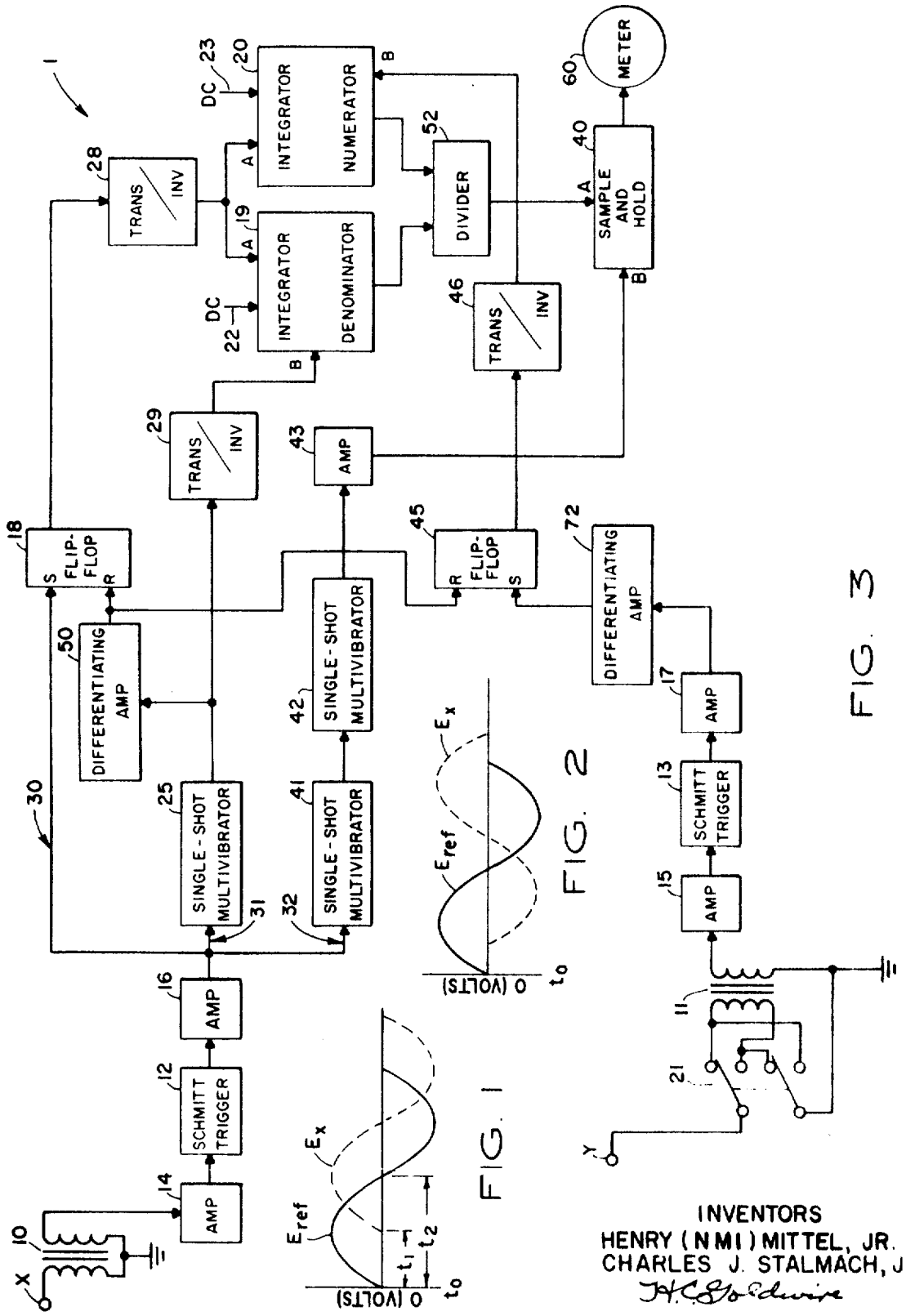

MEANS AND METHOD FOR MEASURING THE PHASE OF AN ALTERNATING ELECTRICAL SIGNAL

This invention pertains to phase-measuring methods and apparatus and, more particularly, to phase-measuring methods and apparatus providing an indication of the phase of an unknown signal at least once during each cycle of a reference signal to which it is compared.

Within recent years there has been an increasing demand for apparatus for measuring the phase angle of electrical signals, especially signals of low frequency. To meet this demand, many new designs for electronic phase meters have been proposed. A difficulty associated with known designs, however, is that each lacks a response time sufficiently short to permit the accurate monitoring of rapidly changing phase angles of the electrical signals.

In prior phase meters it has been necessary to scan several successive cycles of a particular wave whose phase is to be determined in order to obtain a readout of the phase relationship. A phase meter is required for many applications wherein an accurate phase reading can be made in response to no more than one cycle of the electrical wave.

It is an object of the invention to provide phase-measuring apparatus which is possessed of highly improved phase-measuring capacity.

A further object of the invention is to provide a phase meter having a sufficiently fast response to permit the monitoring of phase changes of an electrical wave occurring as often as every half-cycle of that wave.

An additional object is to provide an improved method for measuring the phase angle of an electrical wave.

A still further object is to provide phase-measuring apparatus useful for measuring the phase angle between an alternating reference signal and an alternating electrical signal during a particular cycle of the reference signal and for providing an indication of the phase relationship during that cycle.

Another object is to provide a method for measuring the phase relationship between an alternating reference signal and an alternating electrical signal during a particular cycle of the reference signal.

In accordance with these and other objects, the phase-measuring apparatus of the present invention comprises circuits providing a means for measuring the ratio of specifically defined time intervals which are respectively associated with an input reference signal and with another input signal, the phase of which is being measured, and the respective circuit produces an output signal which represents this ratio and which is proportional to the phase angle between the two input signals. Since the phase angle of the reference signal is known, the ratio signal is then applied to calibrated indicating means for displaying the phase angle of the unknown input signal with respect to the phase angle of the reference signal.

A preferred embodiment of the invention utilizing the just-described technique comprises a pair of integrators for providing a pair of output signals respectively proportional to first and second time intervals where the first time interval is related to a first electrical wave which oscillates about a reference axis and, particularly, to the point in time when the first wave crosses the reference axis beyond a given starting point; at the second point in time the same wave crosses the same reference axis the second time. The second time interval is related to the point in time when the first electrical wave crosses the reference axis and the first point in time when the second electrical wave crosses the same axis subsequent to the crossing of the first wave when the second electrical wave is increasing in the same direction as the first of the waves. These two integrator output signals respectively provide the denominator and numerator inputs to an analog divider, the output of which is thus proportional to the ratio of these two time intervals and, therefore, to the phase angle between the input reference signal and the signal being measured.

Other specific features of the invention, as well as further objects and advantages thereof, are more fully recited in the following detailed description taken in conjunction with the accompanying drawing, wherein:

FIG. 1 is a plot of two sinusoidally varying signals on the same time scale, with one of the signals lagging the other;

FIG. 2 is a plot of two sinusoidally varying signals on the same time scale, with one of the signals lagging the other by more than 180°;

FIG. 3 is a block schematic diagram of a preferred embodiment of the invention.

Figure 4:
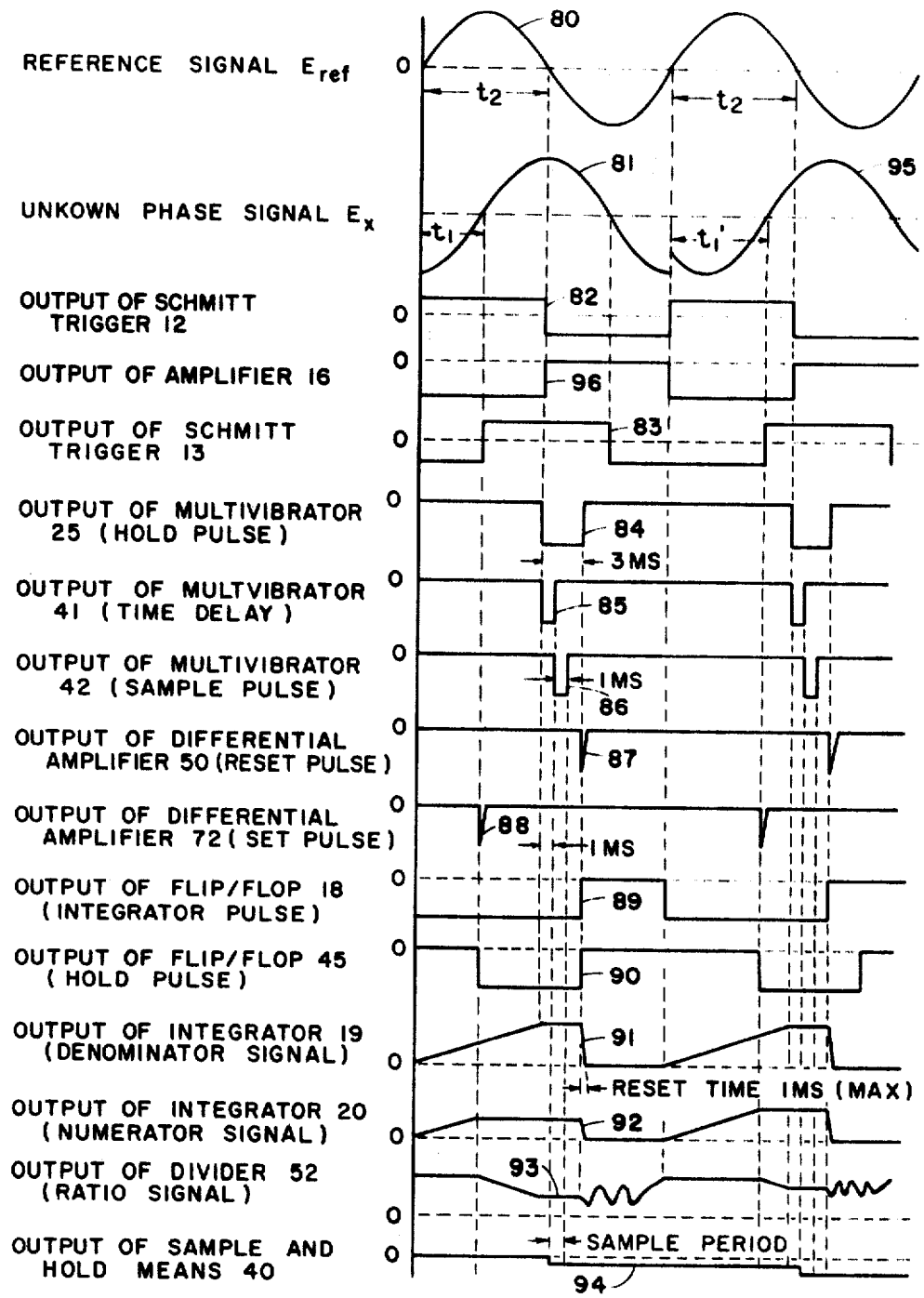
FIG. 4 is a graph showing idealized waveforms at various points in the circuit illustrated in FIG. 3 and further illustrating aspects of the operation of the circuit.

With reference to FIG. 1 and in accordance with the method of this invention, a reference signal ($E_{ref}$) having a known configuration and having a known relationship to a designated point in time is plotted on the same time scale axis as a second signal ($E_x$) having an unknown phase angle with respect to $E_{ref}$. The phase angle may be constant or may vary within limits, and the apparatus of this invention will provide an accurate phase measurement.

As shown in FIG. 1, time interval $t_2$ is designated as the time delay between a crossing by $E_{ref}$ of a reference level about which $E_{ref}$ is alternating (in this case zero volts) and at which point $E_{ref}$ is increasing in amplitude in a particular direction, and the next crossing of the reference level by the same signal. Time interval $t_1$ is designated as the time delay from the time $E_{ref}$ crosses the reference level and the time that $E_x$ crosses the same level for the first time subsequent to the first crossing of $E_{ref}$ whereat $E_x$ is changing in amplitude in the same direction as $E_{ref}$ was changing at its first crossing. The phase angle of $E_x$ with respect to $E_{ref}$ is proportional to the ratio of the time intervals, i.e., $t_1/t_2$. The point at which $E_{ref}$ initially crosses the reference level can be taken as the starting time, $t_o$, to which all measurements are to be related; thus, the phase angle of $E_{ref}$ is 0° with respect to $t_o$, and when the phase of $E_x$ differs from that of $E_{ref}$ by less than 180°, the phase angle of $E_x$ is $t_1/t_2$ times 180° with respect to $t_o$. FIG. 2 illustrates the situation where the phase difference between $E_x$ and $E_{ref}$ is more than 180°. In this case, a convenient way to determine the phase relationship is to invert $E_x$ (or $E_{ref}$), compute the phase difference between the first and second signals as suggested above, and then, add 180° to the computed result. It will be apparent that if all DC voltage components are removed from the reference signal and from the unknown signal, the points where each alternating signal passes through the zero-voltage level may be called "zero-crossing points." While sine waves are used throughout this disclosure for purposes of convenience, the concept of this invention applies equally well to one-cycle-response phase measurement of signals having various other wave shapes.

A preferred embodiment of the invention is illustrated in FIG. 3 wherein circuitry 1 is employed to compute the ratio $t_1/t_2$ (which ratio is representative of the phase angle of the signal $E_x$), which computation is preferably effected during every cycle of the reference signal.

Accordingly, in a preferred embodiment of this invention, the reference wave $E_{ref}$ and the unknown signal $E_x$ are respectively applied to input terminals X and Y of circuitry 1, which terminals are connected respectively to transformers 10 and 11. Transformers 10 and 11 serve to decouple the input signals from any DC voltage components, thus producing sinusoidal waves at the transformer secondaries, which waves alternate about the zero axis (see FIG. 1). Each transformer 10, 11 has a connection to a signal ground in accordance with standard practice. Other means for decoupling the DC voltage components would be equally useful, in lieu of transformers. Intermediate the input terminal Y and the transformer 11 is a switch 21 for inverting the input signal $E_x$ for situations where $E_x$ differs in phase from $E_{ref}$ by more than 180°. It is clear in the case of the switch 21, as in the case of transformers 10 and 11, that other known means may be used to accomplish the inverting function.

The secondary windings of transformers 10 and 11 are thereafter respectively coupled by way of conventional amplifiers 14 and 15 to Schmitt triggers 12 and 13. The Schmitt triggers 12 and 13 are of the type presently known in the art and produce a substantially square wave output signal which, in the embodiment shown, alternatively swings positive and negative with respect to the zero-voltage level. The duration of each one-half cycle of the square wave output of the trigger 12 precisely corresponds to the period of one-half cycle of $E_{ref}$, with positive one-half cycles of the square wave corresponding to positive one-half cycles of $E_{ref}$. With switch 21 in the noninverting position, the output of Schmitt trigger 13 corresponds similarly to $E_x$. Each trigger 12, 13 operates to produce the described output so long as an input signal ($E_x$ or $E_{ref}$) is applied.

The output signals of triggers 12 and 13 are fed, respectively, to amplifiers 16 and 17. Amplifiers 16 and 17 are functional to amplify the current of signals applied thereto, while amplifiers 14 and 15 are voltage amplifiers functional to increase the voltage of the respective signals to a magnitude sufficient to drive the trigger circuits.

Three separate signal channels are coupled to the output of amplifier 16; a first channel 30 couples the output of the amplifier 16 to the "set" input (S) of a bistable flip-flop device 18, and the output of the flip-flop device is connected to a translator and inverter device 28. The translator and inverter device 28 has an output which is coupled to the input terminal A of each of a pair of three-mode integrators 19, 20. A second channel 31 includes a single-shot multivibrator 25 having an input connection coupled to the output of amplifier 16. The output of the multivibrator 25 is connected to an input connection of translator-inverter 29 whose output is in turn connected to an input terminal B of integrator 19. The output of multivibrator 25 is also coupled through differentiating amplifier 50 to the "reset" terminal (R) of flip-flop device 18 and the "reset" terminal (R) of flip-flop device 45.

A third channel 32 includes two single-shot multivibrators 41, 42 coupled in series, with the input of multivibrator 41 coupled to the output of amplifier 16 and the output of multivibrator 42 coupled through amplifier 43 to a first input terminal B of a sample-and-hold means 40.

Each of the three-mode integrators has an input connected to a common source of DC voltage at 22, 23, and each has an output terminal coupled, respectively, to separate input terminals of analog divider means 52. An output of analog divider means 52 is coupled to an input terminal A of the sample-and-hold means 40. The output of the sample-and-hold means 40 is coupled to an appropriate readout device, for instance, a meter 60.

The output of amplifier 17 is connected through a differentiating amplifier 72 to the set input (S) of flip-flop device 45, and the output of flip-flop device 45 is coupled through a translator and inverter means 46 to an input terminal B of the three-mode integrator 20.

The three-mode integrators 19, 20 are each characterized in operation by the fact that a signal pulse of proper polarity and amplitude, applied to the input terminal A, causes integration of the DC input voltage to take place therein, such that the output voltage of each device increases in a linear manner so long as the pulse at terminal A is applied. If a signal pulse of proper amplitude and polarity is applied to terminal B, the integration stops and the voltage at the output of the integrator remains constant at the amplitude which the output voltage had achieved when the signal was applied to terminal B, so long as the signals are applied to terminals A and B. Various types of three-mode integrators known to the art may be used for the devices 19 and 20, and one such device, a Model 3003/16 Three-Mode Integrator, manufactured by Burr-Brown Research Corporation of Tucson, Arizona, was used in the preferred embodiment shown.

Each of the flip-flops 18 and 45 is a conventional bistable device which, upon the application of a pulse of energy of a proper magnitude and polarity to the set input (S), produces a constant-level output voltage until the flip-flop is reset by the application of a second pulse of proper polarity and magnitude to the reset input (R) thereof. When reset, the output of each respective flip-flop 18, 45 is zero volts.

Each single-shot multivibrator 25, 41, 42 is characterized by the fact that a pulse of proper polarity and magnitude applied to the input of each respective unit causes the unit to produce a single output pulse of known amplitude, duration, and polarity; the output pulse of each multivibrator being produced in response to a change in voltage in a positive direction (+ dv./dt.). For the reasons set forth below, the pulse produced by multivibrator 25 is negative, 10 volts in amplitude, and 3 milliseconds in duration, while the pulses produced by multivibrators 41, 42 are each negative, 10 volts in amplitude, and 1 millisecond in duration.

The differentiating amplifier 50 provides a negative output pulse or trigger pulse of short duration corresponding to a change in voltage in a positive direction (+ dv./dt.).

The translator/inverter devices 28, 29, 46 are operative to scale, respectively, the voltage output of the flip-flop 18, the single-shot multivibrator 25, and the flip-flop 45 to a voltage level suitable for input to integrators 19 and 20, and each such device inverts the polarity of the signal applied thereto, again to make the signals compatible with the polarity requirements of the integrators 19, 20.

The analog divider 52 to which the output signals from the integrators 19 and 20 are fed produces an output voltage which is proportional to the ratio of the two integrator signals applied thereto. While various devices known in the art may be employed for divider 52, one suitable device is a Model 4012/25 Analog Divider, manufactured and sold by Burr-Brown Research Corporation.

The sample-and-hold means 40 is, as the name applies, a device which, upon receipt of a command signal generated in third channel 32, samples the ratio signal applied thereto from the integrators 19, 20 and produces an output voltage which corresponds to the ratio-voltage input and holds the output voltage until the next sample command is received. A typical device for use in the embodiment illustrated is a Sample and Hold module, Model 1663/16, Burr-Brown Research Corporation.

The significance of the above-described function of each of the individual modules and of the circuit connections is explained in the following material relating to the operation of the embodiment illustrated.

The operation of the circuit 1 which is illustrated in FIG. 3 is best understood with reference to the idealized wave shapes of certain of the functional components, which wave shapes are shown in FIG. 4. For this reason, FIGS. 3 and 4 will be discussed together.

The reference signal, $E_{ref}$, is applied to the input terminal X, and the unknown signal $E_x$, whose phase with respect to $E_{ref}$ is to be determined, is applied to input terminal Y. $E_x$ is fed through switch 21 to transformer 11. Switch 21 is initially in the noninverting position (as shown), and transformers 10 and 11 are connected such that the signal appearing on the secondary of each transformer is in phase with the signal applied to the primary. The transformers 10, 11 serve to remove any DC voltage components from the signals applied thereto. This in effect causes the alternating signals $E_{ref}$ and $E_x$ to oscillate about zero volts and establishes zero volts as a reference axis. With the DC components removed, the input signal $E_{ref}$ is amplified by amplifier 14 and fed directly to the Schmitt trigger 12. In FIG. 4, curve 80 illustrates a typical reference signal. The Schmitt trigger 12 produces a square wave output signal the period of which corresponds to the period of the reference signal 80 and which alternates positive and negative and in phase with the reference signal. Curve 82 illustrates the output signal produced by Schmitt trigger 12. The output signal represented by curve 82 is then fed to the amplifier 16 which amplifies the current of the signal and produces a phase shift 180° between the amplifier input and its output; additionally, the signal is offset by the amplifier in a negative direction so that the square wave alternates between a negative value (in the preferred embodiment −10 volts) and zero volts (see curve 96). This signal is then fed to the flip-flop device 18 set input (S).

As previously set forth, an object of this invention is to produce a phase indication corresponding to the phase difference between two alternating electrical signals which is updated every cycle; thus, in describing the operation of the invention it is convenient to consider only a single cycle of the respective waves involved. It follows that the initial crossing of the zero reference axis by the signal $E_{ref}$ is designated $t_o$, and all other times (and phase relationships) will be referenced to that point in time. It is clear from the foregoing that when $E_{ref}$ is increasing in a positive direction at $t_o$, then the output of amplifier 16 at time $t_o$ is negative and remains so for one-half cycle. This negative portion of the square wave when applied, as described, to the flip-flop 18 causes the flip-flop to turn ON and to produce at its output terminal a negative voltage, which in the embodiment illustrated is about −10 volts. This −10 volt signal is fed to translator/inverter unit 28 wherein the signal is again inverted and scaled down in magnitude so that the output of inverter 28 is about +6 v., and the level and the polarity of the signal is thus rendered compatible with the voltage and polarity of input terminals A of the integrators 19, 20. The DC voltage 22, 23 applied to the integrators is continuously available, and as the output of the inverter 28 is applied to the respective inputs A of the integrators 19, 20, the respective integrators begin to integrate. The output curve 91 for integrator 19 illustrates the result, which curve is more fully described in the material that follows.

Prior to the time that the signal from inverter 28 is applied to the input terminal A of integrator 19, the integrator output is zero volts, and as soon as the inverter signal (from inverter 28) is applied to terminal A, the output of the integrator begins to rise and continues to rise until the integration is stopped by the application of an appropriate signal to terminal B of the integrator. When an appropriate signal is applied to terminal B, integration ceases in the integrator 19, and the output voltage thereof holds at the magnitude obtained during the integration period until a signal is removed from both terminals A and B. Integrator 20 is substantially identical with integrator 19, and, therefore, it operates in the same manner; however, as is explained in the material that follows, the signal applied to terminal B derives from a different source than the signal that is applied to terminal B of the integrator 19. This is an important distinction, because, in this manner, the output voltage produced and held by integrator 20 is made to correspond to the initial zero-crossing point of the signal $E_x$ where $E_x$ is increasing in the same direction that $E_{ref}$ is increasing at time $t_o$; thus, the output voltage of integrator 20 corresponds to the time $t_1$ of curve 81, and the output voltage produced and held by integrator 19 corresponds to the time $t_2$ of curve 80. From these respective integrator outputs, then, the phase-difference between $E_{ref}$ and $E_x$ can be computed as previously described.

The hold command to be applied to input terminal B of integrator 19 is produced in channel 31, which is connected to the output of amplifier 16. The single-shot multivibrator 25 receives the signal from amplifier 16, which signal, as previously described, is negative during the first one-half cycle immediately following $t_o$. Also as previously described, the multivibrator 25 does not produce its single output pulse until the signal applied at its input changes in a positive direction. The output of amplifier 16 does not begin to go positive until the beginning of the second one-half cycle of the particular cycle of $E_{ref}$ in which the phase analysis is being made. Thus, a delay of one-half cycle is introduced, but at the end of the one-half cycle delay, the multivibrator 25 produces a 3 millisecond, negative pulse of about 10 volts, as shown by curve 84. Curve 84 illustrates the timing involved wherein the 3 millisecond, negative pulse produced begins at the end of the first one-half cycle past $t_o$ and extends for 3 milliseconds thereafter (compare curves 80, 82, 96 to 84). The output of multivibrator 25 is applied to inverter 29 which operates, as did inverter 28, to scale the multivibrator output (10 volts) to a level compatible with the integrator and to invert the signal so that the polarity is also compatible (+6 volts). As this signal is applied to the input terminal B of integrator 19, the integration therein is stopped, and the integrator output voltage is held for at least 3 milliseconds (the duration of the control pulse). The integrator 19 has been allowed to integrate and to produce a continuously rising output voltage for a full one-half cycle before the hold pulse is applied to input terminal B; thus, the peak voltage obtained and held (refer to curve 91) corresponds to the time period $t_2$ (refer to curve 80).

The signal applied to input terminal B of integrator 20 is derived from the signal whose phase is to be determined, $E_x$, in the following manner. The signal at the secondary of transformer 11 is in phase with the signal $E_x$ applied to the input terminal Y. The signal is amplified by amplifier 15, and the Schmitt trigger 13 produces therefrom a square wave output signal similar to that produced by trigger 12 but, in this case, in phase with the signal $E_x$ (see curve 83). The square wave is amplified by amplifier 17 to produce a current gain and is fed to the differentiating amplifier 72. The output signal produced by amplifier 17 is in phase with the input thereto (as opposed to amplifier 16, wherein the phase is reversed), but is otherwise similar to the output signal of amplifier 16. As the square wave signal is applied to the differentiating amplifier 72 and changes state from negative to zero at a point corresponding to the initial zero-crossing point of the signal $E_x$ (where $E_x$ is increasing in the same direction that $E_{ref}$ was increasing at time $t_o$), the differentiating amplifier 72 produces a negative output pulse in response to the changing condition (+ dv./dt.). This negative output signal is applied to flip-flop 45 to set the flip-flop in an ON condition such that it, in turn, produces a constant-level output voltage of about −10 volts. This signal (−10 volts) is applied through inverter 46, which operates similarly to inverters 28 and 29, to the input terminal B of integrator 20. Integrator 20 therefore ceases integration and holds the output voltage previously generated until flip-flop 45 is reset, and, simultaneously, the signal from inverter 28 is removed from the input terminal A. Since the hold command applied to integrator 20, terminal B, corresponds to the initial zero-crossing point of the signal $E_x$ (as described above), it follows, therefore, that the maximum voltage generated and held by integrator 20 (see curve 92) corresponds to the time period $t_1$ (see curve 81).

As previously described, the ratio of the respective integrator output voltages ($t_1/t_2$) is proportional to the phase difference between the two signals $E_{ref}$ and $E_x$; therefore, the analog divider 52 functions to produce an output voltage proportional to this ratio by dividing the respective signals.

The output voltage from analog divider 52 is applied to sample-and-hold means 40 at input terminal A, and the means 40 operates upon the application of a command signal at input terminal B thereof to sample the applied signal (from the divider 52), in a manner described in the following material, and to hold the voltage obtained by sampling and to produce an output voltage corresponding thereto until it is again commanded to sample, whereupon, if the second voltage obtained by sampling has changed with respect to the first-sampled voltage, the output voltage produced by the means 40 changes accordingly (see curve 94). The output voltage from the means 40 is therefore continually updated and is applied to a meter 60 or other indicating device. In the embodiment illustrated, the sample command is provided once each cycle, as described below, with the important result that the phase reading desired is produced for the first cycle of data available from the signal $E_x$ and is updated each cycle thereafter. This is an extremely important result where a phase analysis is required and only a few cycles of data relating to the unknown signal are available and is an equally important result where an analysis of phase between each signal is required as often as each cycle. The output of sample-and-hold means 40 can be applied to a fast printing device, such as a computer with a line printer, so that the phase variations are recorded for further analysis. Curve 94 shows the output voltage produced by means 40 and illustrates the response caused by changing conditions of $E_x$ (see curves 81 and 95); the curve 94 is negative solely because an inversion is produced by the Burr-Brown device used as means 40.

The signal which commands means 40 to sample during each cycle is generated as follows. The output of amplifier 16 is applied to single-shot multivibrator 41. Again, as with multivibrator 25, there is a delay of one-half cycle before multivibrator 41 triggers. In the case of multivibrator 41, a negative output pulse of 1 millisecond is produced (see curve 85) with the leading edge of the pulse corresponding to the second zero-crossing point (past $t_o$) of the reference signal $E_{ref}$ and continuing for 1 millisecond thereafter. The output pulse of multivibrator 41 is then applied to multivibrator 42 which, similarly, produces a negative output pulse of 1 millisecond duration (see curve 86) but whose leading edge corresponds with the trailing edge of the pulse produced by multivibrator 41 so that the pulse continues for 1 millisecond after the pulse from multivibrator 41 shuts OFF (see curve 86). The pulse produced by multivibrator 42 is then fed to the sample-and-hold means 40 to command that unit to sample the output voltage of the divider 52. Multivibrators 41 and 42, therefore, act together to cause the means 40 to sample during (at approximately the center) the 3 millisecond holding period of integrator 19 (see curve 84) when the output voltage corresponds to the time interval $t_2$. Since the voltage corresponding to $t_1/t_2$, at the output of integrator 20, remains constant until the flip-flop 45 is reset, the reset mechanism described below is designed to operate only after the expiration of the 3 millisecond holding period of integrator 19 such that the voltage corresponding to time period $t_2$ is available to divider 52 simultaneously with the voltage corresponding to time interval $t_1$, and, in this manner, a valid ratio reading is provided to the sample-and-hold means 40 by the divider.

Therefore, the output of integrator 19, representing time period $t_2$ (see curve 91), is divided into the output of integrator 20, which output represents time period $t_1$ (see curve 92), by divider 52 to produce a voltage output representing the ratio of the two time periods (see curve 93), and the divider output is sampled during a time interval (see curve 86) when the voltage output of each integrator 19, 20 corresponds to a value related to its respective time period for a given cycle of the reference signal ($E_{ref}$). The sample-and-hold means 40 output (see curve 94) changes as the sampled voltage changes at each sampling period; thus, a continuous one-cycle response is achieved.

When the phase between $E_{ref}$ and $E_x$ is greater than 180°, the switch 21 is activated to invert the signal $E_x$. In this event, the phase difference between $E_{ref}$ and $E_x$ (inverted) is measured in the manner previously described, and 180° (or a voltage corresponding thereto) is added to the result to obtain the true phase relationship between the signals. The procedure for changing the phase of $E_x$ in the latter case, i.e. over 180° phase-difference, can be accomplished automatically by known equipment, if desired.

In keeping with the object of this invention, to maintain single-cycle response of a phase reading during the first and each subsequent cycle of a signal whose phase is to be determined, it is necessary to reset each flip-flop 18, 45 at an appropriate time after a sample has been taken by means 40 and before the end of the respective cycle; thus, a differentiating amplifier 50 is coupled to the output of multivibrator 25. As previously explained, the amplifier 50 responds to a change in voltage in a positive direction (+ dv./dt.) to produce a negative output pulse (see curve 87). This output pulse is applied to the reset terminals (R) of flip-flops 18 and 45, and as a result, the flip-flops each change state and their output voltage goes to zero. The first positive-going voltage change in the output signal of multivibrator 25 occurs at the trailing edge of the 3 millisecond, negative pulse, when the multivibrator switches OFF and its output returns from a negative value to zero volts; thus, the flip-flops 18 and 45 are reset at the end of the 3 millisecond period and prior to the end of the first cycle of the reference signal $E_{ref}$.

Where the phase of the signal $E_x$ changes during the next cycle, a new set of time periods are established (see curve 95), and a new phase relationship involving times $t_1$ and $t_2$ is computed in the manner just described, and the output of the sample-and-hold means 40 changes correspondingly (see curve 94).

Various modifications may be made to the circuitry illustrated in FIG. 3 consistent with the concept underlying the present invention. For example, the response of the present phase meter may be increased twofold by adding another full set of components similar to those illustrated in FIG. 3, wherein the new integrators, similar to 19 and 20, are made to begin integration on the negative half cycles. Such a combined system would then provide a new phase reading every one-half cycle as opposed to every full cycle for the apparatus previously described. Furthermore, the concept of the present invention of measuring the ratio of time intervals associated with each of the input signals $E_{ref}$ and $E_x$ may be carried out by providing appropriate triggering on the peak amplitude points of the signals, rather than the zero-crossing points thereof. A major advantage of the phase-measuring scheme proposed is the capacity of the apparatus to measure the phase angle of a signal whose phase is rapidly varying on a cycle by cycle (or half-cycle by half-cycle) basis rather than requiring the averaging of the phase difference between the signals over a substantially longer period of time. Equally important is the capacity of the device constructed in accordance with this invention to measure and to provide an indication of the phase difference between the signals during the first cycle sampled. Meaningful and accurate information is rapidly obtained when only a few cycles of data are available for study.

A method for measuring the phase difference between the two alternating electrical signals, $E_{ref}$ and $E_x$, is accomplished by first producing a first intermediate signal corresponding to the time interval $t_2$, previously described. In the embodiment illustrated (FIG. 3), a voltage is generated which corresponds in amplitude to the time interval $t_2$; however, other apparatus and other types of signals could be used. For instance, a digital signal representative of the time interval $t_2$ could be produced. A second step involves producing a second intermediate signal similarly corresponding to the time interval $t_1$, previously defined. The third step would then be dividing the second intermediate signal by the first intermediate signal to produce a ratio signal representative of the ratio of the two time intervals ($t_1/ta2$). Again, the division could be accomplished digitally, and the ratio could be represented by a digital-type numerical readout. The final step of the method would be indicating the phase difference between the two electrical signals in response to the ratio signal produced.

Various other modifications to the disclosed embodiment and method, as well as further embodiments of each, may become apparent to one ordinarily skilled in the art without departing from the spirit and scope of the invention as defined by the appended claims.

What we claim is:

1. Apparatus for measuring the phase angle between two alternating electrical signals, comprising:
    a. first and second input means for respectively receiving said two electrical signals;
    b. first circuit means coupled to said first input means for producing an output signal proportional to a first time interval between first and second reference points associated with one of said electrical signals;
    c. second circuit means coupled to said second input means for producing an output signal proportional to a second time interval between said first reference point and another reference point associated with the other of said electrical signals;
    d. dividing means coupled to said first and second circuit means for dividing the output signal of said second circuit means by the output signal of said first circuit means for providing an output signal from said dividing means representative of the ratio of said second time interval to said first time interval; and e. means coupled to said dividing means for indicating the phase angle between said electrical signals as a function of said ratio output signal.

2. The apparatus as described in claim 1 wherein said first and second reference points are the zero-crossing points of said one electrical signal, and said another reference point is a zero-crossing point of said other electrical signal.

3. The apparatus claimed in claim 1 wherein at least one of the alternating electrical signals is a sinusoidal signal.

4. The apparatus as described in claim 3 wherein both electrical signals are sinusoidal signals and wherein said first and second reference points are the peak amplitude points of said one sinusoidal signal, and said another reference point is a peak amplitude point of said other sinusoidal signal.

5. Phase-indicating apparatus, comprising:
   a. first source means for providing a reference signal of known frequency and phase;
   b. second source means for providing a signal of variable phase with respect to said reference signal;
   c. first integrator means for integrating a first DC voltage applied to said first integrator means to produce, at the output of said first integrator means, a constant-level voltage corresponding to the integration time of said first integrator means;
   d. second integrator means for integrating a second DC voltage applied to said second integrator means to produce, at the output of said second integrator means, a constant-level voltage corresponding to the integration time of said second integrator means;
   e. first means for producing a first output pulse in response to one portion of said reference signal and applying said output pulse to said first and second integrator means, thereby to simultaneously initiate the integration by each of said integrators;
   f. second means for producing a second output pulse in response to another portion of said reference signal and applying said output pulse to said first integrator means to terminate integration therein and to hold the output of said first integrator at a constant signal level;
   g. third means for producing a third output pulse in response to a portion of said variable-phase signal and applying said third output pulse to said second integrator means to terminate the integration of the other of said integrators and to hold the output of said second integrator at a constant signal level;
   h. means for dividing the output signal from said second integrator by the output signal from said first integrator, to provide a ratio signal;
   i. means coupled to said divider means for selectively sampling the ratio signal during the holding period of both the first and second integrators; and
   j. means for indicating the selectively sampled ratio signal.

6. The apparatus as defined by claim 5 wherein said one and another portions of said reference signal are the zero-crossing points of a half-cycle of said reference signal, and the said portion of said variable-phase signal is the initial zero-crossing point of the half-cycle of said variable-phase signal.

7. Phase-measuring apparatus, comprising:
   a. a first source of reference signals having a known frequency and phase;
   b. a second source of signals having variable phase with respect to said reference signals;
   c. first trigger means coupled to said first source for providing stepped output signals corresponding to the positive and negative half-cycles of said reference signals;
   d. first and second integrator means having an integrate, hold, and reset mode;
   e. controlling means coupling said first trigger means to said first and second integrator means for initiating the integrate mode of said integrators, thereby to produce output signals from said integrators;
   f. hold means coupling said first trigger means to said first integrator means for terminating the integrating mode of said first integrator, thereby to hold the output signal from said first integrator at a constant value proportional to a first time interval of said half-cycle of said reference signal;
   g. second trigger means coupled to said second source for providing stepped output signals corresponding to the positive and negative half-cycles of said variable-phase signals;
   h. hold means coupling said second trigger means to said second integrator means for terminating the integrating mode of said second integrator, thereby to hold the output signal from said second integrator at a constant value proportional to a second time interval said variable-phase signals lags said reference signals;
   i. dividing means coupled to the outputs of said first and second integrator means for dividing the output signal from said second integrator by the output signal from said first integrator to provide a ratio signal at the output of said dividing means proportional to the ratio of said second time interval to said first time interval;
   j. sampling-and-holding means coupled to said dividing means for selecting, when triggered, specific portions of said ratio signal;
   k. means coupled to said first trigger means for triggering said sampling-and-holding means during the simultaneous hold modes of both of said integrators, thereby to produce a selected output signal from said sampling-and-holding means; and
   l. means coupled to said sampling-and-holding means for displaying said selected output signal.

8. The apparatus as described by claim 7 including reset means coupled to said first-mentioned holding means for resetting said first and second integrators.

9. The apparatus as described by claim 7 wherein said controlling means comprises a bistable flip-flop device triggered by the positive output signal from said first trigger means; said first-mentioned hold means is a single-shot multivibrator triggered by the negative output signal from said first trigger means and producing an output pulse having a specific pulse width, the said pulse width determining the duration of time the output signal from the first integrator is held constant; and said second-mentioned hold means comprises another bistable flip-flop device, the width of which output signal pulse determines the duration of time the output signal from the second integrator is held constant.

10. The apparatus as described by claim 9 wherein said triggering means coupled to said sample-and-hold means comprises at least one single-shot multivibrator having an output pulse triggered by the negative output signal from said first trigger means.

11. Apparatus for measuring the phase difference between two electrical signals which alternate about a given reference axis, comprising:
   a. first means for producing a voltage which corresponds in amplitude to a time interval determined by the first intersection of a first of said electrical signals with the reference axis and the second intersection of the same signal with the reference axis;
   b. second means for producing a voltage which corresponds in amplitude to a time interval related to the first intersection of the first electrical signal with the reference axis and the first intersection of the second electrical signal with the reference axis whereat the second electrical signal is changing in amplitude in the same direction that the first electrical signal was changing at the time the first electrical signal intersected said reference axis;
   c. dividing means for dividing the voltage produced by said second means by the voltage produced by said first means to provide a ratio voltage representative of the phase difference between said first and second signals; and d. means coupled to the dividing means for indicating the phase difference between the two electrical signals in response to the ratio voltage produced by said dividing means.

12. The apparatus claimed in claim 11 wherein the given reference axis is zero volts.

13. The apparatus claimed in claim 11 wherein at least one of the two electrical signals is a sinusoidal signal.

14. A method for measuring the phase difference between two electrical signals which alternate about a given reference axis, comprising the steps of:
 a. producing a first intermediate signal corresponding to a time interval determined by the first intersection of a first of said electrical signals with the reference axis and the second intersection of the same signal with the reference axis;
 b. producing a second intermediate signal corresponding to a time interval related to the first intersection of the first electrical signal with the reference axis and the first intersection of the second electrical signal with the reference axis whereat the second electrical signal is changing in amplitude in the same direction that the first electrical signal was changing at the time the first electrical signal intersected the reference axis;
 c. dividing the second intermediate signal by the first intermediate signal to produce a ratio signal representative of the phase difference between said first and second electrical signals; and
 d. indicating the phase difference between the two electrical signals in response to the ratio signal produced.

15. The method claimed in claim 14 wherein the given reference axis is zero volts.

16. The method claimed in claim 14 wherein at least one of the two electrical signals is a sinusoidal signal.

17. The method claimed in claim 14 wherein the first and second intermediate signals produced are, respectively, voltages corresponding in amplitude to the time intervals which they represent, and the ratio signal produced is a voltage corresponding to the ratio of the time intervals thus represented.